United States Patent [19]

Mehta

[11] 4,363,261
[45] Dec. 14, 1982

[54] CYLINDER ASSEMBLY AND METHOD OF REPLACING SEALS AND BEARINGS

[75] Inventor: Mehar K. Mehta, Miami Springs, Fla.

[73] Assignee: Equipment Company of America, Hialeah, Fla.

[21] Appl. No.: 185,847

[22] Filed: Sep. 10, 1980

[51] Int. Cl.³ .................. F15B 15/24; F16J 15/18; F01B 29/00
[52] U.S. Cl. .................................. 92/128; 92/13.8; 92/168
[58] Field of Search ............ 92/13.8, 128, 168, 13; 91/54; 277/9

[56] References Cited

U.S. PATENT DOCUMENTS

| | | | |
|---|---|---|---|
| 2,736,294 | 2/1956 | Buehner | 92/13.8 |
| 2,785,537 | 3/1957 | Mojonnier | 92/13.8 |
| 2,987,046 | 6/1961 | Atherton | 92/128 |
| 3,584,541 | 6/1971 | Cunninghom | 92/168 |

FOREIGN PATENT DOCUMENTS

| | | | |
|---|---|---|---|
| 2257665 | 8/1973 | Fed. Rep. of Germany | 92/168 |
| 929649 | 7/1947 | France | 92/168 |

*Primary Examiner*—Paul E. Maslousky
*Attorney, Agent, or Firm*—Cullen, Sloman, Cantor, Grauer, Scott & Rutherford

[57] ABSTRACT

A cylinder assembly comprises a cylinder having a bore, a bearing therein and an extension bore. A head on the cylinder removably mounts and retains a gland assembly including a piston rod seal and wiper. A piston rod is reciprocally mounted within the bore and bearing and at its outer end mounts a stop plate assembly engageable with the cylinder head. The stop plate assembly is removable from the piston rod which is retractable into the extension bore, the outer end of the piston rod being inward of the wiper and seal, to permit removal and replacement of the seal and wiper. The method of replacing the seal and wiper from a cylinder assembly without disassembling the assembly or disconnecting the assembly from its support includes the steps of removing the stop plate assembly from the rod, retracting the rod into the bore extension until the front end of the rod clears the wiper and seal and removing and replacing the seal and wiper. A further step includes the reassembly of the stop plate upon the rod and drawing up the piston rod to the stop plate assembly. The method of replacing the cylinder bearings without disassembly of the cylinder or removal of the cylinder from its support includes the steps of removing the rod and connected stop plate assembly from the cylinder; removing the gland assembly from the cylinder head; and thereafter withdrawing and replacing the bearings from within the cylinder.

16 Claims, 6 Drawing Figures

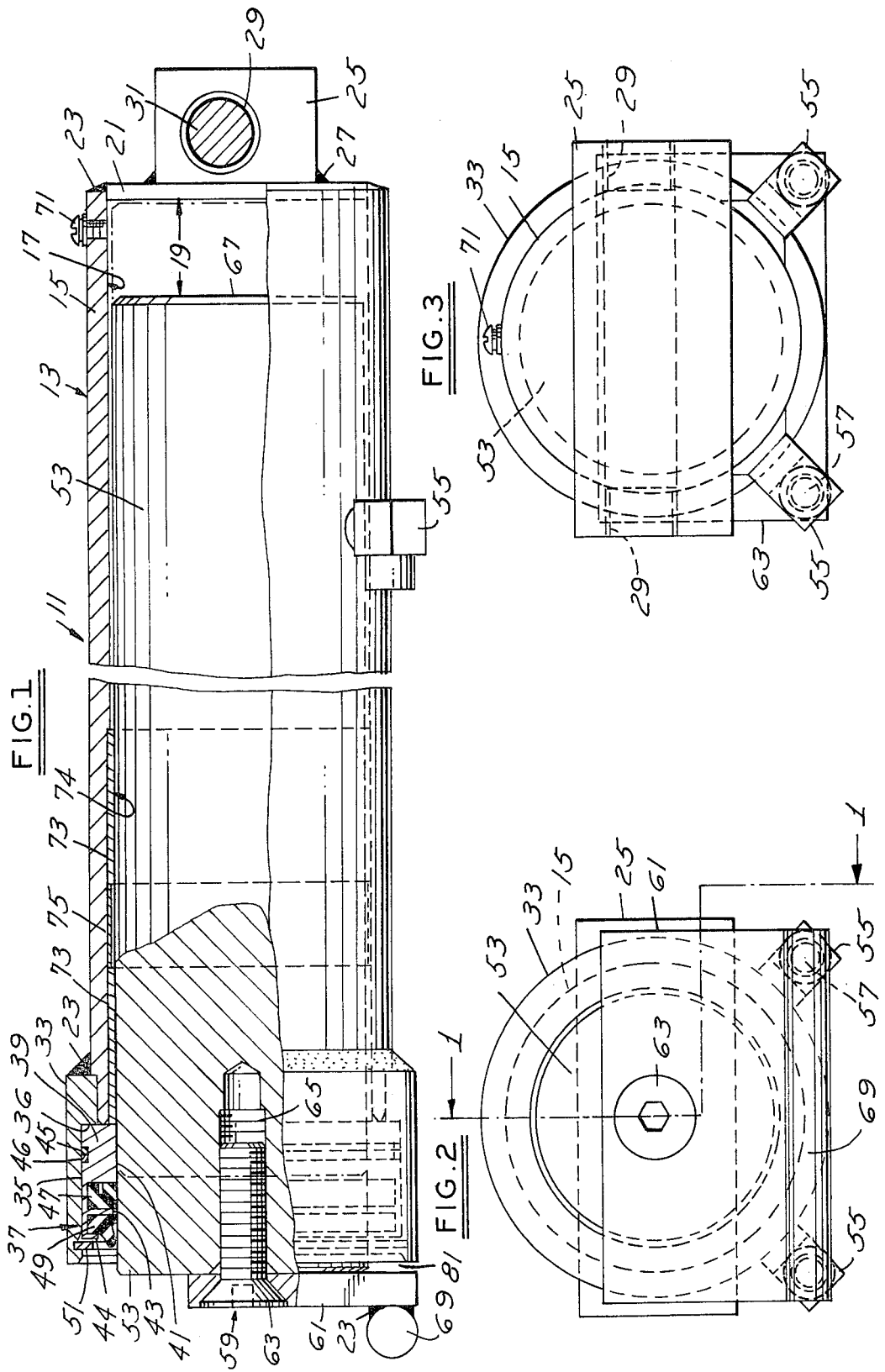

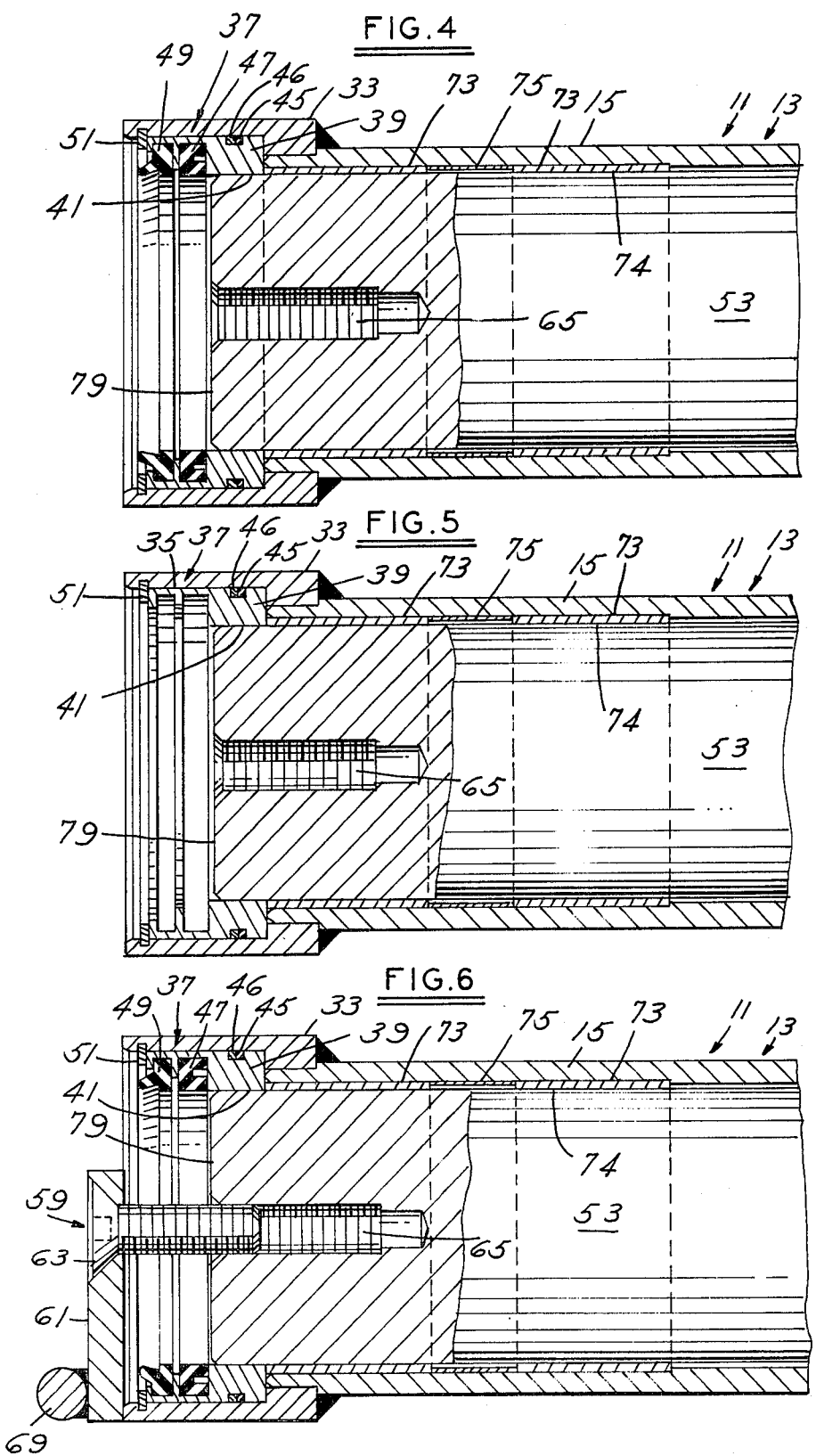

CYLINDER ASSEMBLY AND METHOD OF REPLACING SEALS AND BEARINGS

BACKGROUND OF THE INVENTION

In connection with cylinder assemblies and particularly in connection with the ram type of cylinder presently in use in scissorlift platform tables or scissorlift type hydraulic loading docks, as in most cylinders the bearings, the seals and rod wipers are fast wearing and require replacement from time to time. In the typical ram type cylinder, it is necessary to remove the entire piston rod from the cylinder in order to replace the gland assembly which includes the piston rod seal and wiper. Often times, it is necessary to remove the entire cylinder from the supporting machine or unit. These rods are very heavy, some about 200 to 500 pounds depending upon length and size. Considerable time and labor has been heretofore required in order to replace such bearings, seals and wipers.

In the prior art bearings of cylinders of this type, particularly in ram type cylinders used in the scissor-lift industry, employed a welded gland construction. Such bearings therefore are non-removable. In case the bearings must be changed, the entire cylinder barrel assembly must be changed which is an expensive and time consuming operation.

SUMMARY OF THE INVENTION

An important feature of the present cylinder assembly provides a means by which the rod seal and wiper may be replaced without removal of the piston rod from the cylinder and without removal of the complete cylinder assembly from its support.

A further feature of the invention includes the provision of an extension bore at the inner end of the conventional cylinder bore into which the piston rod is manually retracted after first removing the thrust angle stop plate assembly from the piston rod. The piston rod is retracted within the cylinder bore and into the extension bore until the threaded end face of the piston rod clears the seal. The rod wiper and the seal can then be removed and replaced.

A still further feature of the present invention includes the thrust stop assembly which is repositioned over the end of the piston rod and with the head screw tightened, the piston rod is automatically pulled from the extension bore back into the cylinder bore to its normal position in engagement with the thrust angle assembly.

Another feature of the present invention is to provide a cylinder head upon the cylinder which mounts the bearings and with the gland assembly and an internal retaining ring upon the interior of the cylinder head so that without removing the cylinder assembly from the supporting environment, the piston rod and connected thrust angle assembly may be withdrawn and removed from the bore of the cylinder and successively thereafter the internal retaining ring and gland assembly may be removed from the cylinder head providing access to the bearings. The bearings can then be removed from the cylinder by a conventional bearing puller. The cylinder is reassembled by introducing the bearings and successively the gland assembly, retaining ring and piston rod and its connected thrust angle stop assembly.

An important feature of the present invention is directed to the method of replacing a piston rod seal and wiper from a cylinder assembly which includes the steps of removing the thrust angle assembly from the piston rod, thereafter manually retracting the piston rod into the cylinder bore extension until the front end of the piston rod clears the piston rod seal and thereafter removing and replacing the piston rod seal and wiper. A further method step includes the reassembly of the thrust angle assembly upon the piston rod and upon the tightening of the head screw automatically pulling the piston rod from the bore extension to its normal position.

A further feature of the present invention includes the method of removing and replacing the bearings from a cylinder assembly without the disassembly and complete replacement of the cylinder assembly which includes the steps of withdrawing the piston rod and connected thrust angle stop assembly from the cylinder, thereafter removing the gland assembly from the cylinder head and thereafter withdrawing the bearings from the cylinder bore and replacing same. A further step includes the reassembly of the gland assembly and retaining ring within the cylinder head and successively thereafter reassembling of the piston rod through the gland assembly and bearings back to its normal position.

These and other features will be seen from the following specification and claims in conjunction with the appended drawings.

THE DRAWINGS

FIG. 1 is a side elevational view of the present cylinder assembly partly broken away and sectioned, being a section taken in the direction of arrows 1—1 of FIG. 2.

FIG. 2 is a left end elevational view of FIG. 1.

FIG. 3 is a right end elevational view of FIG. 1.

FIG. 4 is a fragmentary longitudinal section of the cylinder assembly as shown in FIG. 1, but with the thrust angle assembly moved and the piston rod retracted so as to clear the rod seal.

FIG. 5 is a similar view with the worn rod wiper and seal removed from the gland assembly.

FIG. 6 is a similar view of the rod seal and wiper replaced into the empty gland assembly shown in FIG. 5, and with the thrust angle assembly of FIG. 1 replaced and partly secured upon the piston rod.

It will be understood that the above drawings illustrate merely a preferred embodiment of the invention and the methods herein and that other embodiments and method steps are contemplated within the scope of the claims hereafter set forth.

DETAILED DESCRIPTION OF A PREFERRED EMBODIMENT OF THE INVENTION

Referring to the drawings and particularly FIG. 1, there is shown the cylinder assembly, and particularly a ram type cylinder assembly generally indicated at 11. Such cylinder assemblies are adapted for use in connection with equipment for effecting power movement in one direction as for example in scissorlift platform tables or scissorlift type hydraulic loading docks without excluding other usages to which such single acting cylinder may be applied.

The present cylinder assembly includes a cylinder 13, in the illustrative embodiment of the single acting type, which includes an elongated barrel 15 having a conventional longitudinal bore 17. The bore 17 terminates at one end and in an extension bore 19 to accommodate the negative stroke of the piston rod hereafter described, said extension bore 19 being further defined by the end cap 21 secured over the end of barrel 15 and welded thereto at 23.

The centrally disposed transverse pin block 25 is applied to cap 21 and suitably secured thereto as by the welds 27. Block 25 has a longitudinal bore therethrough and receives at its outer ends a pair of bushings 29 adapted for cooperative registry with a supporting pin or shaft 31 forming a part of a tool or machine to provide an anchor for the cylinder assembly 11 and a support by which the cylinder assembly 11 is pivotally mounted upon such machine or tool.

Cylinder head 33 has a bore 35, is mounted over the open end of the barrel 15 and secured thereto as by the weld 23 FIG. 1, with the bore 35 defining a stop shoulder 36 within the head 33.

A gland assembly 37 is nested, assembled and retained within bore 35 of the cylinder head 33 and includes the gland 39 which bears against the stop shoulder 36. The glad 39 has a bore 41 cooperatively receiving the reciprocal ram type piston rod 53.

The gland 39 includes an annular internal flange 43 and an outer annular flange 44, and is retained in position within the head 33 by the internal snap ring 51.

Gland 39 has an external "O" ring seal 45 and a backup ring 46 engaging the cylinder head 33 and mounts and nests therein the respective rod seal 47 and rod wiper 49 whose internal annular surfaces are in cooperative sealing and wiping engagement with the exterior surface of the ram type piston rod 53.

The piston rod 53 in the present embodiment is reciprocally positioned within the bore 17 of the barrel 15 and within the bore 74 of the corresponding bearings or bushings 73 therein which are separated axially by an intermediate spacer 75.

The piston rod 53 is normally positioned within the bore 74 of the bearing or bushing 73 and gland bore 41 and in the position shown in FIG. 1 has been slightly advanced therein to the extent that the stop plate 61 is spaced as at 81 outwardly of the cylinder head 33.

In the illustrative embodiment there are applied upon opposite sides of the barrel 15 toward the rear end thereof a pair of opposed pressure fittings 55 which have tapped bores 57 at their outer end and which are adapted for communication with bore 17 at the inner end of the barrel 15. In the illustrative embodiment suitable pressure conduits are connected into the bores 57 of the pressure fittings 55 so that as desired pressurized air, or alternatively, a pressurized hydraulic fluid such as oil may be applied to (or exhausted from) the inner end of the cylinder 13 and to the bore 17 therein and including the extension bore 19 for forcefully advancing the piston rod 53 outwardly of the cylinder 13 for moving a part of a machine or device, normally loaded.

A thrust angle assembly or a thrust angle stop assembly 59 is mounted upon the outer end face 79 of the piston rod 53. The thrust angle assembly 59 includes the transverse stop plate 61 which normally bears against the end face of the piston rod 53, extends transversely of its longitudinal axis and is secured thereto by the socket headed elongated screw 63. The screw 63 extends axially into engagement with the internally threaded bore 65 of the piston rod 53. In the normal position of the piston rod 53, the stop plate 61 secured to the piston rod 53 bears against cylinder head 33. At the same time, the inner end 67 of the piston rod 53 is within the standard bore 17 of the cylinder 13 at the forward edge of extension bore 19.

The transverse thrust bar 69 extends along the lower edge of stop plate 61 and is suitably secured thereto as by welds 23. Upon loosening of socket headed screw 63, the stop plate 61 and the connected thrust bar 69 can be angularly adjusted with respect to the cylinder head 33 to determine the plane application of longitudinal force. When the piston rod 53 is advanced from its normal retracted position it causes movement of a linkage of a mechanism within a tool to which it has been pivotally mounted and suspended effecting a forcing action of some nature. In one illustration the cylinder assembly 13 is pivotally mounted by its pin block 25 upon a transverse pin or shaft 31 forming a part of the tool or machine. At the same time thrust bar 69 on the stop plate 61 of the thrust angle assembly 59 is positioned with respect to a movable part of the machine, such as a scissorlift platform table or scissorlift type hydraulic loading dock as to on forward advancement of the piston rod 53 effects such pushing action to the yieldable loaded part of the tool as to cause such raising or extension of a movable part thereof as required. In the present illustrative embodiment the cylinder assembly 13 is of a single acting type as the weight of the load and the weight of the associated parts on the scissorlift platform table or other type of scissorlift loading product or other device is such as would normally bias the piston rod 53 to the retracted position shown in FIG. 1.

Accordingly, the single acting cylinder assembly 11 is sufficient for providing pressure fluid upon the interior closed end of the cylinder 13 into the bore 17 and into the space defined as the extension bore 19 to forcefully advance the piston rod 53 outwardly of the cylinder 13.

In the illustrative embodiment a pair of longitudinally spaced bushings or bearings 73 are mounted and snugly secured upon the interior of barrel 15 within the bore 17 thereof with a suitable spacer 75 interposed.

As shown in FIG. 1, adjacent the end of the barrel 15 there is provided a transverse threaded bleeder screw 71 normally closing an opening in communication with bore 17. The bleeder screw 71 may be partly withdrawn to permit the escape of compressed air upon the interior of bore 17 and the extension bore 19. In normal operation the bleeder screw 71 is snugly assembled into the barrel 15.

In accordance with the present construction and as to distinguish from the prior art, it is a relatively simple matter of replacing the worn red seal 47 and wiper 49 in a very limited amount of time and without disassembly of the cylinder 13, without removal of the piston rod 53, and without its separation from the device upon which it is pivotally mounted. All that is necessary is to withdraw the socket headed screw 63 from the piston rod 53 and remove the thrust angle assembly 59. Thereafter the piston rod 53 is manually retracted into the extension bore 19 such as to the clearance position shown in FIG. 4. Herein the threaded end face 79 of the piston rod 53 is inwardly of the piston rod seal 47 and rod wiper 49. Thereafter the respective piston rod seal and wiper are manually removed from the gland assembly 39 such as shown in FIG. 5 and may be immediately replaced as shown in FIG. 6. Thereafter the thrust angle assembly 59 including the stop plate 61 are applied transversely across the end of the cylinder head 33 and the socket headed screw 63 loosely threaded down into the threaded aperture 65 within the piston rod 53. Just as soon as there is a snug engagement of the stop plate 61 with the cylinder head 33, further advancement of the screw 63 will draw the piston 53 from the position shown in FIG. 6 back to the position shown in FIG. 1, its normal position. Actually in FIG. 1, the piston rod 53 has been advanced a slight distance outwardly of its normal position as shown by the spacing between stop plate 61 and the cylinder head 33.

The present construction is an improvement over the prior art where it was difficult if not impossible to remove the bearings to replace same without completely removing the cylinder from the associated device and completely disassembling the cylinder. In accordance with the present invention the bearings can be removed and replaced without disassembling the cylinder from the tool or machine. This is accomplished merely by manually withdrawing the piston rod 53 and its connected thrust angle assembly 59 completely from the cylinder. Thereafter snap ring 51 is removed and successively the complete gland assembly 39 is removed from the cylinder head 33. Thereafter using a conventional bearing puller, respective bearings 73 and spacer 75 may be withdrawn from the bore 17 of the barrel 15 and thereafter replaced.

The method is completed by the reassembly of the gland assembly 39 within the bore of the cylinder head 33 including the piston rod seal 47 and the rod wiper 49, and snap ring 51, and thereafter reassembling the piston rod 53 through the gland assembly 39 through the respected bearings 73 back into the cylinder bore 17 substantially to the position shown in FIG. 1. Normally the stop plate 61 is in registry with cylinder head 33 such as shown in FIG. 6.

The present construction and method has provided a means for the very easy replacement of the seals and wipers without removal or disassembly of the cylinder. The cylinder remains inside the unit, and there is no need to remove the piston rod from the cylinder. Accordingly, maintenance time in replacement of seals is cut down to a very minimum.

The same thing is true with respect to removal and replacement of the bearings herein. Again this can be done without replacement of the complete cylinder assembly and without removal of the cylinder assembly from the unit. This is accomplished merely by removal of the piston rod, successive removal of the internal retaining ring and the gland assembly providing access to the bearings. These can now be removed from the cylinder by a suitable bearing puller, the cylinder thereafter can be reassembled by introducing the bearings, the gland assembly, retaining ring and then the piston rod. This avoids the very costly operation of removing and replacing the entire barrel assembly. By making the bearings removable, maintenance cost is brought down to a very minimum.

Having described my invention, reference should now be had to the following claims.

I claim:

1. A cylinder assembly comprising a cylinder open at one end and closed at the other end and having a bore and a bore extension therein;

a head secured upon said cylinder open end;

a gland assembly nested, sealed and retained within said head;

said gland assembly including a rod seal and rod wiper;

a piston rod reciprocally and guidably mounted within said cylinder bore and cooperatively extending through said seal and wiper;

said piston rod having a length less than the length of said head and cylinder;

and a thrust angle stop assembly mounted upon and secured to said piston rod and engageable with said head when said piston rod is manually retracted;

said thrust angle stop assembly being removable from said piston rod;

said piston rod being manually retractible into said bore extension and clearing said rod wiper and seal to facilitate removal and replacement of said wiper and seal.

2. In the cylinder assembly of claim 1, said cylinder including a barrel and an end cap fixed to said barrel, said bore and bore extension being within said barrel, with said bore extension being adjacent said cap;

said head being secured over the open end of said barrel and having a bore greater than said barrel bore, defining a stop shoulder;

said gland assembly bearing against said shoulder;

and said piston rod being of the ram type.

3. In the cylinder assembly of claim 1, and an internal snap ring retained within said head and bearing against said gland assembly.

4. In the cylinder assembly of claim 1, the guide mounting of said piston rod including an removable elongated bearing nested and retained within said cylinder bore inwardly of said gland assembly.

5. In the cylinder assembly of claim 1, the guide mounting of said piston rod including a pair of removable longitudinally spaced elongated bearings nested and retained within said cylinder bore, and a removable spacer between said bearings.

6. In the cylinder assembly of claim 1, said extension bore being of a length to accommodate said piston rod when manually retracted, so that the outer end of said piston rod is inward of said rod seal and wiper.

7. In the cylinder assembly of claim 1, said gland assembly having an internal annular flange between said rod seal and wiper, and an internal annular flange at its outer end retainingly engaging said rod wiper.

8. In the cylinder assembly of claim 1, said thrust angle stop assembly including an apertured stop plate extending transversely of and bearing against said piston rod;

and an elongated screw extending through and retainingly engaging said plate and threaded into said piston rod.

9. In the cylinder assembly of claim 8, said thrust angle stop assembly and its stop plate and screw on successive reassembly upon and securing to said piston rod, advancing said piston rod to its normal position within said cylinder bore.

10. In the cylinder assembly of claim 8, said thrust angle stop assembly including a force transmitting rod mounted upon and along the edge of said stop plate and secured thereto;

said stop assembly being rotatably adjustable relative to said piston rod for regulating the pressure plane of said force transmitting rod.

11. In the cylinder assembly of claim 1, a transversely apertured pin block mounted across and secured to the other end of said cylinder;

providing a means for pivotally mounting and anchoring said cylinder assembly upon a support pin.

12. In the cylinder assembly of claim 1, and a bleeder screw normally extending radially into said cylinder adjacent its bore, and removable to bleed said bore facilitating retraction of said piston rod into said extension bore.

13. In a cylinder assembly including a cylinder with a bore and bearings therein and an extension bore, a head, a gland assembly within said head including a rod seal and wiper, a piston rod guidably mounted within said cylinder and extending through said seal and wiper, and a stop plate assembly removably mounted upon said piston rod and engageable with said head;

a method of replacing said rod seal and wiper without removing the piston rod from the cylinder comprising:

(a) removing the stop plate assembly from said piston rod;

(b) retracting said piston rod within said bore and into said extension bore until said piston rod clears said rod wiper and seal; and (c) removing and replacing said rod seal and wiper within said gland assembly.

14. In the method of claim 13, the further step of reassembling said stop plate assembly upon said piston rod and in the securing thereto pulling said piston rod from said extension bore into said cylinder bore to its normal position.

15. A method of removing and replacing a rod seal and wiper of a gland assembly within a head of a cylinder assembly having a cylinder, a piston rod guidably mounted within the cylinder and extending through the seal and wiper, and a stop plate assembly removably mounted upon the piston rod and without removing the piston rod from the cylinder which comprises:

(a) removing the stop plate assembly from the piston rod;

(b) retracting said piston rod within said cylinder until said piston rod clears said rod wiper and seal; and (c) removing and replacing said rod seal and wiper within said gland assembly.

16. In the method of the claim 15, the further step of reassembling said stop plate assembly upon said piston rod and in securing thereto pulling said piston rod in said bore to its normal position.

* * * * *